(12) United States Patent
Sato et al.

(10) Patent No.: US 6,462,121 B2
(45) Date of Patent: Oct. 8, 2002

(54) OLEFIN-BASED RESIN COMPOSITION

(75) Inventors: Masashi Sato, Yokkaichi (JP); Tatsuya Hase, Yokkaichi (JP); Hiroshi Fujimoto, Yokkaichi (JP)

(73) Assignees: Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/759,216

(22) Filed: Jan. 16, 2001

(65) Prior Publication Data

US 2002/0099122 A1 Jul. 25, 2002

(30) Foreign Application Priority Data

Dec. 1, 2000 (JP) ......................................... 2000-367152

(51) Int. Cl.$^7$ ................................................. C08K 3/10
(52) U.S. Cl. ...................................... 524/434; 524/436
(58) Field of Search ................................. 524/434, 436

(56) References Cited

U.S. PATENT DOCUMENTS

| | | |
|---|---|---|
| 4,622,350 A | 11/1986 | Icenogle et al. |
| 4,722,959 A | 2/1988 | Inoue et al. |
| 4,794,132 A | 12/1988 | Djiauw et al. |
| 4,826,899 A | 5/1989 | Rees |
| 4,853,154 A | 8/1989 | Icenogle et al. |
| 4,863,995 A | 9/1989 | Murakami et al. |
| 4,942,069 A | 7/1990 | Keogh |
| 4,952,428 A | 8/1990 | Keogh |
| 4,983,742 A | 1/1991 | Yusawa et al. |
| 5,025,042 A | 6/1991 | Yoshida et al. |
| 5,057,367 A | 10/1991 | Morii et al. |
| 5,104,920 A | 4/1992 | Keogh |
| 5,211,746 A | 5/1993 | Keogh et al. |
| 5,262,467 A | 11/1993 | Keogh et al. |
| 5,317,051 A | 5/1994 | Harashige et al. |
| 5,401,787 A | 3/1995 | Tonyali |
| 5,418,272 A | 5/1995 | Kawabata et al. |
| 5,444,809 A | 8/1995 | Aoki et al. |
| 5,468,807 A | 11/1995 | Tsurutani et al. |
| 5,473,016 A | 12/1995 | Fujii et al. |
| 5,476,709 A | 12/1995 | Inoue et al. |
| 5,482,990 A | 1/1996 | Jow et al. |
| 5,561,185 A | 10/1996 | Hashimoto et al. |
| 5,573,840 A | 11/1996 | Inoue et al. |
| 5,656,371 A | 8/1997 | Kawahigashi et al. |
| 5,670,748 A | 9/1997 | Gingue et al. |
| 5,698,323 A | 12/1997 | Keough et al. |
| 5,707,732 A | 1/1998 | Sonoda et al. |
| 5,747,574 A | 5/1998 | Kanamori |
| 5,889,087 A | 3/1999 | Hayashi et al. |
| 5,973,070 A | * 10/1999 | Baann ........................ 525/70 |
| 6,025,422 A | 2/2000 | Hall |
| 6,025,423 A | 2/2000 | Breant |
| 6,034,162 A | 3/2000 | Mizutani et al. |
| 6,200,679 B1 | 3/2001 | Hase et al. |

FOREIGN PATENT DOCUMENTS

| | | |
|---|---|---|
| DE | 4230157 | 12/1993 |
| DE | 4440394 | 5/1995 |
| EP | 0508415 | 10/1992 |
| EP | 0530940 | 3/1993 |
| EP | 0871181 | 10/1998 |
| EP | 0972803 | 1/2000 |
| JP | 7-78518 | 3/1995 |
| JP | 7-176219 | 7/1995 |
| JP | 7-182930 | 7/1995 |
| WO | 96/22328 | 7/1996 |

OTHER PUBLICATIONS

English Language Abstract of JP 7–176219.
English Language Abstract of JP 7–78518.
Derwent Abstract No. 1994–361016 (Oct. 7, 1994).
Derwent Abstract No. 1994–129459 (Mar. 18, 1994).

* cited by examiner

*Primary Examiner*—Kriellion A. Sanders
(74) *Attorney, Agent, or Firm*—Greenblum & Bernstein, P.L.C.

(57) ABSTRACT

There is provided an olefin-based resin composition which may be applied to the coatings of electrical cables used in automobiles. The coatings have neatly balanced properties to satisfy the product requirements, such as wear and flame resistance, tensile strength, flexibility, and heat and freeze resistance. The olefin-based resin composition includes: (i) a polymeric material in an amount of 100 parts by weight which includes: (a) about 50 to 80 parts by weight of propylene polymer portion including at least one propylene polymer; (b) about 1 to 20 parts by weight of polyolefin portion including at least one polyolefin, a proportion of about 0.1 to 10% by weight of which is structurally modified through maleic acid anhydride treatment; and (c) about 10 to 40 parts by weight of olefin-based polymer portion including at least one thermoplastic resin having a melting point of at least about 130° C. and a Shore A hardness of up to about 90; and (ii) about 20 to 300 parts by weight of at least one metal hydroxide.

36 Claims, No Drawings

OLEFIN-BASED RESIN COMPOSITION

BACKGROUND OF THE INVENTION

1. Field of the Invention

The present invention relates to olefin-based resin compositions, and more preferably halogen-free olefin-based resin compositions. These compositions are used for coating electrical cables used in automobiles. The above compositions therefore preferably satisfy the requirements of the automobile industry, as regards, e.g., wear resistance, flame resistance, tensile strength and flexibility.

2. Description of Background Information

Poly(vinylchloride) has been the primary material for automobile electrical cables. The reason is that this polymer has good mechanical strength, formability at extrusion with electrical cables, flexibility and paintability. The polymer is also an inexpensive material.

Recently, however, global environmental concerns have compelled the automobile industry to reconsider the choice of product types used for automobile parts, including the coatings of electrical cables. As a result, halogen-free resin materials are currently replacing poly(vinylchloride).

Accordingly, research has been undertaken into the wear-resistant resin compositions that do not generate toxic gases, such as halogen gases, when they are burned. Such compositions include halogen-free compositions containing a polyolefin-based polymer and a metal hydroxide as a flame retardant, as disclosed in Japanese patent applications published under Nos. HEI 7-176219 and HEI 7-78518, the disclosures of which are herein incorporated by reference in their entireties. Further, Japanese patent application published under No. HEI 7-182930, the disclosure of which is herein incorporated by reference in its entirety, describes a composition containing a polymeric material consisting of a polypropylene-type resin, a polyethylene treated with an unsaturated carboxylic acid, and an ethylene-type copolymer, on the one hand, and a metal hydroxide, on the other.

However, when the compositions described above are used in order to retard combustion or perform auto-extinction of the flame, a large amount of metal hydroxides must be added to the compositions. The mechanical strength of the compositions, such as wear resistance and tensile strength, is then greatly diminished. In order to avoid such a deterioration, polypropylene or a high-density polyethylene, which is a relatively hard resin, has been added to the compositions. However, this tends to degrade the flexibility and formability of the coated electrical cables.

SUMMARY OF THE INVENTION

An aspect of the present invention is therefore to provide an olefin-based resin composition which is preferably free of halogen and has well-balanced properties required for the coatings of electrical cables used in automobiles. These properties include wear resistance, flame resistance, tensile strength, flexibility, heat resistance and low-temperature resistance.

To this end, there is provided an olefin-based resin composition comprising:

(i) a polymeric material in an amount of 100 parts by weight which includes:
  (a) about 50 to 80 parts by weight of propylene polymer portion comprising at least one propylene polymer;
  (b) about 1 to 20 parts by weight of polyolefin portion comprising at least one polyolefin, a proportion of about 0.1 to 10% by weight of which is structurally modified through maleic acid anhydride treatment; and
  (c) about 10 to 40 parts by weight of olefin-based polymer portion comprising at least one thermoplastic resin having a melting point of at least about 130° C. and a Shore A hardness of up to about 90; and
(ii) about 20 to 300 parts by weight of at least one metal hydroxide.

Preferably, the polyolefin portion treated with maleic acid anhydride (b) accounts for about 2 to 10% by weight of the polymeric material (i), the olefin-based polymer portion (c) accounts for about 20 to 30% by weight of the polymeric material (i), and the metal hydroxide product (ii) comprises at least one metal hydroxide in an amount of about 50 to 150 parts by weight relative to 100 parts by weight of the polymeric material (i).

Preferably yet, the metal hydroxide product (ii) comprises at least one metal hydroxide in an amount of about 70 to 90 parts by weight relative to 100 parts by weight of the polymeric material (i).

Suitably, the propylene polymer portion (a) has a melt flow rate of about 0.1 to 5 g/10 minutes.

Further, the propylene polymer portion (a) may comprise at least one of propylene-ethylene block copolymer, propylene-ethylene random copolymer and propylene homopolymer.

Preferably, the polyolefin portion treated with maleic acid anhydride (b) may at least comprise polypropylene structurally modified through maleic acid anhydride treatment.

Preferably yet, the olefin-based polymer portion (c) comprises at least one of polopropylene and propylene-ethylene copolymer.

Suitably, the metal hydroxide product (ii) is treated with silane coupling agent.

Preferably, the silane coupling agent comprises aminosilane coupling agent.

As understood from the foregoing, the olefin-based resin composition according to the invention is preferably substantially free of halogen.

The invention further concerns an electrical cable coated with such an olefin-based resin composition.

DETAILED DESCRIPTION

The above and other aspects, features and advantages of the invention will be made apparent from the following illustrative description.

All percent measurements in this application, unless otherwise stated, are measured by weight based upon 100% of a given sample weight. Thus, for example, 30% represents 30 weight parts out of every 100 weight parts of the sample.

Unless otherwise stated, a reference to a compound or component, includes the compound or component by itself, as well as in combination with other compounds or components, such as mixtures of compounds.

The propylene polymer portion (a) includes, for example, propylene homopolymer, block or random copolymer of propylene and ethylene. Preferably, the propylene polymer portion (a) has a melt flow rate (MFR) of about 0.1 to 5 g/10 min. MFR is measured according to the method based on Standard JIS K 6921-2.

Examples of such propylene polymers include RB610A (block copolymer), RB410 (random copolymer) and RB110 (homopolymer), manufactured and commercialized by TOKUYAMA CORP.

When the proportion of such propylene polymer portion exceeds the above-mentioned upper limit of about 80% by weight of the polymeric material (i), the composition obtained becomes less flexible and less formable.

Conversely, when its proportion is less than the lower limit of about 50% by weight, the composition obtained becomes less resistant to wear.

Examples of maleic acid anhydride-treated polyolefin portion (b) include polyethylene, polypropylene, polybutene, ethylene-vinyl acetate copolymer (EVA), ethylene-ethyl acrylate copolymer (EEA), ethylene-methyl acrylate copolymer (EMA), ethylene-methyl methacrylate copolymer, ethylene-propylene rubber and ethylene-butene copolymer. A preferred example is polypropylene treated with maleic acid anhydride, since it gives an inventive composition having a sufficient level of hardness and wear resistance without performing cross-linking.

The proportion of maleic acid-anhydride-treated polyolefin portion (b) in the polymeric material (i) ranges from about 1 to 20, preferably from about 2 to 10% by weight.

When its proportion exceeds the upper limit of about 20% by weight, the polyolefin portion (b) reacts strongly with the metal hydroxide, so that the tensile elongation (elongation rate at breaking point) of the composition is reduced, and its flexibility is impaired.

Conversely, when its proportion is less than the lower limit of about 1% by weight, the composition is less wear resistant.

Preferred examples of thermoplastic resins as olefin-based polymer portion (c) include polypropylene and propylene-ethylene copolymer, and mixtures thereof. Such examples include "PER R410E" and "PER T310J", manufactured and commercialized by TOKUYAMA CORP.

The thermoplastic resin preferably has a melting point of at least about 130° C. and a Shore A hardness of up to about 90.

When the melting point is less than about 130° C., the composition may not be sufficiently heat-resistant.

The proportion of thermoplastic resin as olefin-based polymer portion (c) in the polymeric material (i) ranges from about 10 to 40%, preferably from about 20 to 30% by weight.

When this proportion exceeds the upper limit of about 40% by weight, the composition becomes less resistant to wear.

Conversely, when its proportion is less than the lower limit of about 10% by weight, the composition becomes too hard and less formable.

Examples of the metal hydroxide product (ii) include magnesium hydroxide and aluminum hydroxide, preferably in their particle state. Suitably, metal hydroxide particles used in the invention are treated with a coupling agent, preferably silane coupling agent and higher fatty acid. The silane coupling agent includes, e.g., an aminosilane coupling agent, a vinylsilane coupling agent and an epoxysilane coupling agent. Examples of higher fatty acid include stearic acid and oleic acid. Among the above examples, magnesium hydroxide treated with silane coupling agent, in particular with aminosilane coupling agent, is most preferably used.

The proportion of metal hydroxide product (ii) added to the polymeric material (i) ranges from about 30 to 200, preferably from about 50 to 150, more preferably from about 70 to 90 parts by weight, relative to 100 parts by weight of polymeric material (i).

When the proportion of metal hydroxide product (ii) is too high, the elongation rate, wear resistance, flexibility and formability of the composition are reduced.

On the other hand, when its proportion is too low, flame resistance of the composition is degraded.

The olefin-based resin composition of the present invention may further contain an appropriate amount of additives, such as usual additives, such as anti-oxidants, copper-damage inhibitors and lubricants, insofar as they do not impair the above-described product features.

The inventive olefin-based resin composition can be prepared by mixing and kneading the polymeric material (i) and the metal hydroxide product (ii) supra according to any manner such as known methods.

When the inventive composition is applied to the coatings of electrical cables used in automobiles, these coatings preferably satisfy requirements in terms of wear resistance, flame resistance, tensile strength, flexibility, heat resistance, freeze resistance, etc. Obviously, these coatings preferably generate no halogen gas.

The aminosilane coupling agents contain, in their molecule, functional groups reacting with inorganic compounds and those reacting with organic compounds. Accordingly, when a metal hydroxide is treated with aminosilane coupling agent, they are bonded through those functional groups reacting with inorganic compounds. When the metal hydroxide thus treated is added to the composition of the invention, it becomes firmly bound to the maleic acid anhydride combined with the polyolefin portion (b) or the olefin-based polymer portion (c), through the aminosilane's functional groups which react with organic compounds. As a result, wear resistance of the inventive composition is markedly improved.

When an amino group (as in the above case) and/or an epoxy group is (are) present at the oleophilic group side of the silane coupling agent, that or those group(s) react(s) with the maleic acid anhydride which is bound with the polyolefin portion (b) or the olefin-based polymer portion (c). The hydrophilicity of the inventive composition therefore decreases, and its waterproofing increases. As a result, the composition has not only a better mechanical strength, but also better water-resisting qualities.

EXAMPLES

The invention will be described hereafter with reference to non-limiting prophetic Examples and Comparative Examples. In this regard, each of the Examples and Comparative Examples involves magnesium hydroxide treated with an aminosilane coupling agent having a certain tradename. The use of this tradename with this magnesium hydroxide which was used to generate the data in the Examples and Comparative Examples is proprietary information here. Accordingly, magnesium hydroxide treated with an aminosilane coupling agent having a different tradename, i.e., "MAGNIFIN H51V", was substituted in the Examples and Comparative Examples for the magnesium hydroxide treated with an aminosilane coupling agent used to generate the data. Testing has been conducted to show that "MAGNIFIN H51V" magnesium hydroxide treated with an aminosilane coupling agent, manufactured by ALUSUISSE MARTINSWERK GmbH, functions equivalent to the magnesium hydroxide treated with an aminosilane coupling agent having the proprietary tradename, i.e., the magnesium hydroxide used to generate the data.

Examples 1 to 3 and Comparative Examples 1 to 4

The components indicated in the upper part of the corresponding columns in Tables I and II were mixed in indicated amounts. The resultant mixtures were kneaded in a biaxial extruder at 250° C.

The obtained compositions were extruded around a conductive cable regulated by ISO as 0.5 sq (7/0.32 soft copper wires, indicating seven wires with a diameter of 0.32 mm, and forming a conductor with a cross-section area of 0.5 mm$^2$), to yield a coating thickness of 0.3 mm. The extrusion was performed in dies having a diameter of 1.6 mm and 1.0 mm, respectively, and nipples; at a die temperature of 210 to 230° C. and a cylinder temperature of 200 to 240° C.; and at a line speed of 100 m/min.

The terms in Tables are defined as follows.

"Propylene BP" indicates a propylene-ethylene block copolymer having a MFR of 0.5 g/10 min. An example of such block copolymer is "RB610A" manufactured by TOKUYAMA CORP.

"MAH-PP" indicates a polypropylene, 1% by weight of which is treated with maleic acid anhydride.

"PER" indicates "R410E" or "T310J" manufactured by TOKUYAMA CORP.

"MAGNIFIN H51V" indicates magnesium hydroxide treated with aminosilane coupling agent, manufactured by ALUSUISSE MARTINSWERK GmbH.

The anti-aging agent was a hindered phenol compound, i.e., "TOMINOX TT", manufactured by YOSHITOMI FINECHEMICALS, Ltd.

The coated electrical cables of Examples 1 to 3 and Comparative Examples 1 to 4 subjected to tests for flame resistance, tensile strength, elongation rate and wear resistance according to JASO D611 (Japanese Automobile Standard Organization).

To test wear resistance, an abrasion frequency exceeding 300 times, averaged on 3 samples, was considered as good.

Flexibility was evaluated by hand feeling, when coated electrical cables were bent.

Formability was evaluated by observing whether or not whiskers were formed, when coatings were stripped off from the end portion of the coated electrical cables.

The results of the tests are shown in the lower part of the corresponding columns in Tables I and II.

TABLE I

|  | Example 1 | Example 2 | Example 3 |
| --- | --- | --- | --- |
| Propylene BP | 60 | 65 | 68 |
| MAH-PP | 10 | 5 | 2 |
| PER | 30 | 30 | 30 |
| MAGNIFIN H5IV | 90 | 90 | 90 |
| Anti-aging agent | 1 | 1 | 1 |
| Total | 191 | 191 | 191 |
| Flame resistance | Good | Good | Good |
| Tensile strength (MPa) | 39.2 | 38.3 | 37.4 |
| Elongation rate (%) | 417 | 527 | 613 |
| Wear resistance (frequency) | 6539 | 2594 | 1201 |
| Flexibility | Good | Good | Good |
| Formability | Good | Good | Good |

TABLE II

|  | Comparative Example 1 | Comparative Example 2 | Comparative Example 3 | Comparative Example 4 |
| --- | --- | --- | --- | --- |
| Propylene BP | 90 | 40 | 90 | 55 |
| MAH-PP |  | 30 | 10 | 5 |
| PER | 10 | 30 |  | 40 |
| MAGNIFIN H5IV | 120 | 100 | 80 | 300 |
| Anti-aging agent | 1 | 1 | 1 | 1 |
| Total | 221 | 201 | 181 | 401 |
| Flame resistance | Good | Good | Good | Bad |
| Tensile strength (MPa) | 28.8 | 46.8 | 26.3 | 22.3 |
| Elongation rate (%) | 650 | 80 | 105 | 76 |
| Wear resistance (frequency) | 4437 | 1658 | 10000 | 93 |
| Flexibility | Bad | Bad | Bad | Bad |
| Formability | Bad | Good | Bad | Bad |

According to the results obtained for Comparative Example 1, when a hard resin is added to the composition in a large quantity, instead of adding maleic acid-anhydride-treated polyolefin portion (b), the composition loses flexibility. Electrical cables coated with such a composition become thus less formable.

The results obtained for Comparative Example 2 show that when maleic acid-anhydride-treated polypropylene is added in a great quantity, magnesium hydroxide becomes bound to the resin too firmly, so that the tensile elongation and flexibility of the composition are degraded.

The results obtained for Comparative Example 3 indicate that unless a thermoplastic resin is added, the resin compositions become too hard. The formability of coated electrical cables is thus degraded.

According to the results obtained for Comparative Example 4, when magnesium hydroxide is added in a large amount, the composition has a low elongation rate, and becomes less resistant to wear, less flexible and less formable.

Although the invention has been described with reference to particular means, materials and embodiments, it is to be understood that the invention is not limited to the particulars disclosed and extends to all equivalents within the scope of the claims.

The present disclosure relates to subject matter contained in priority Japanese Application No. 2000-367152, filed on Dec. 1, 2000, which is herein expressly rated by reference in its entirety.

What is claimed:

1. An olefin-based resin composition comprising:
   (i) a polymeric material in an amount of 100 parts by weight which includes:
      (a) about 50 to 80 parts by weight of propylene polymer portion comprising at least one propylene polymer;
      (b) about 1 to 20 parts by weight of polyolefin portion comprising at least one polyolefin, a proportion of about 0.1 to 10% by weight of which is structurally modified through maleic acid anhydride treatment; and
      (c) about 10 to 40 parts by weight of olefin-based polymer portion comprising at least one thermoplastic resin having a melting point of at least about 130° C. and a Shore A hardness of up to about 90; and (ii) about 20 to 300 parts by weight of at least one metal hydroxide.

2. The olefin-based resin composition according to claim 1, wherein:
said polyolefin portion (b) accounts for about 2 to 10 parts by weight of said polymeric material (i),
said olefin-based polymer portion (c) accounts for about 20 to 30 parts by weight of said polymeric material (i), and
said at least one metal hydroxide (ii) comprises at least one metal hydroxide in an amount of about 50 to 150 parts by weight.

3. The olefin-based resin composition according to claim 1, wherein said at least one metal hydroxide (ii) comprises at least one metal hydroxide in an amount of about 70 to 90 parts by weight.

4. The olefin-based resin composition according to claim 2, wherein said at least one metal hydroxide (ii) comprises at least one metal hydroxide in an amount of about 70 to 90 parts by weight.

5. The olefin-based resin composition according to claim 1, wherein said propylene polymer portion (a) has a melt flow rate of about 0.1 to 5 g/10 minutes.

6. The olefin-based resin composition according to claim 2, wherein said propylene polymer portion (a) has a melt flow rate of about 0.1 to 5 g/10 minutes.

7. The olefin-based resin composition according to claim 3, wherein said propylene polymer portion (a) has a melt flow rate of about 0.1 to 5 g/10 minutes.

8. The olefin-based resin composition according to claim 1, wherein said propylene polymer portion (a) comprises at least one of propylene-ethylene block copolymer, propylene-ethylene random copolymer and propylene homopolymer.

9. The olefin-based resin composition according to claim 2, wherein said propylene polymer portion (a) comprises at least one of propylene-ethylene block copolymer, propylene-ethylene random copolymer and propylene homopolymer.

10. The olefin-based resin composition according to claim 3, wherein said propylene polymer portion (a) comprises at least one of propylene-ethylene block copolymer, propylene-ethylene random copolymer and propylene homopolymer.

11. The olefin-based resin composition according to claim 1, wherein said polyolefin portion (b) comprises at least polypropylene structurally modified through maleic acid anhydride treatment.

12. The olefin-based resin composition according to claim 2, wherein said polyolefin portion (b) comprises at least polypropylene structurally modified through maleic acid anhydride treatment.

13. The olefin-based resin composition according to claim 3, wherein said polyolefin portion (b) comprises at least polypropylene structurally modified through maleic acid anhydride treatment.

14. The olefin-based resin composition according to claim 8, wherein said polyolefin portion (b) comprises at least polypropylene structurally modified through maleic acid anhydride treatment.

15. The olefin-based resin composition according to claim 1, wherein said olefin-based polymer portion (c) comprises at least one of polypropylene and propylene-ethylene copolymer.

16. The olefin-based resin composition according to claim 2, wherein said olefin-based polymer portion (c) comprises at least one of polypropylene and propylene-ethylene copolymer.

17. The olefin-based resin composition according to claim 3, wherein said olefin-based polymer portion (c) comprises at least one of polypropylene and propylene-ethylene copolymer.

18. The olefin-based resin composition according to claim 8, wherein said olefin-based polymer portion (c) comprises at least one of polypropylene and propylene-ethylene copolymer.

19. The olefin-based resin composition according to claim 11, wherein said olefin-based polymer portion (c) comprises at least one of polypropylene and propylene-ethylene copolymer.

20. The olefin-based resin composition according to claim 1, wherein said at least one metal hydroxide (ii) is treated with silane coupling agent.

21. The olefin-based resin composition according to claim 2, wherein said at least one metal hydroxide (ii) is treated with silane coupling agent.

22. The olefin-based resin composition according to claim 3, wherein said at least one metal hydroxide (ii) is treated with silane coupling agent.

23. The olefin-based resin composition according to claim 8, wherein said at least one metal hydroxide (ii) is treated with silane coupling agent.

24. The olefin-based resin composition according to claim 11, wherein said at least one metal hydroxide (ii) is treated with silane coupling agent.

25. The olefin-based resin composition according to claim 20, wherein said silane coupling agent comprises aminosilane coupling agent.

26. The olefin-based resin composition according to claim 21, wherein said silane coupling agent comprises aminosilane coupling agent.

27. The olefin-based resin composition according to claim 22, wherein said silane coupling agent comprises aminosilane coupling agent.

28. The olefin-based resin composition according to claim 23, wherein said silane coupling agent comprises aminosilane coupling agent.

29. The olefin-based resin composition according to claim 24, wherein said silane coupling agent comprises aminosilane coupling agent.

30. The olefin-based resin composition according to claim 1, wherein the olefin-based resin composition is halogen-free.

31. The olefin-based resin composition according to claim 2, wherein the olefin-based resin composition is halogen-free.

32. The olefin-based resin composition according to claim 3, wherein the olefin-based resin composition is halogen-free.

33. The olefin-based resin composition according to claim 8, wherein the olefin-based resin composition is halogen-free.

34. The olefin-based resin composition according to claim 11, wherein the olefin-based resin composition is halogen-free.

35. An olefin-based resin composition which is substantially free of halogen, said olefin-based resin composition comprising:
(i) a polymeric material in an amount of 100 parts by weight which includes:
(a) about 50 to 80 parts by weight of propylene polymer portion comprising at least one propylene polymer;
(b) about 1 to 20 parts by weight of polyolefin portion comprising at least one polyolefin, a proportion of about 0.1 to 10% by weight of which is structurally modified through maleic acid anhydride treatment; and (c) about 10 to 40 parts by weight of olefin-based polymer portion comprising at least one thermoplastic resin having a melting point of at least about 130° C. and a Shore A hardness of up to about 90; and (ii) about 20 to 300 parts by weight of at least one metal hydroxide.

36. An electrical cable coated with an olefin-based resin composition, said olefin-based resin composition comprising:

(i) a polymeric material in an amount of 100 parts by weight which includes:

(a) about 50 to 80 parts by weight of propylene polymer portion comprising at least one propylene polymer;

(b) about 1 to 20 parts by weight of polyolefin portion comprising at least one polyolefin, a proportion of about 0.1 to 10% by weight of which is structurally modified through maleic acid anhydride treatment; and (c) about 10 to 40 parts by weight of olefin-based polymer portion comprising at least one thermoplastic resin having a melting point of at least about 130° C. and a Shore A hardness of up to about 90; and (ii) about 20 to 300 parts by weight of at least one metal hydroxide.

* * * * *